June 2, 1970 W. LOBUR 3,515,838
ELECTRICAL DISCHARGE MACHINING PULSE DURATION
CONTROL APPARATUS AND METHOD
Filed Feb. 21, 1967 3 Sheets-Sheet 1
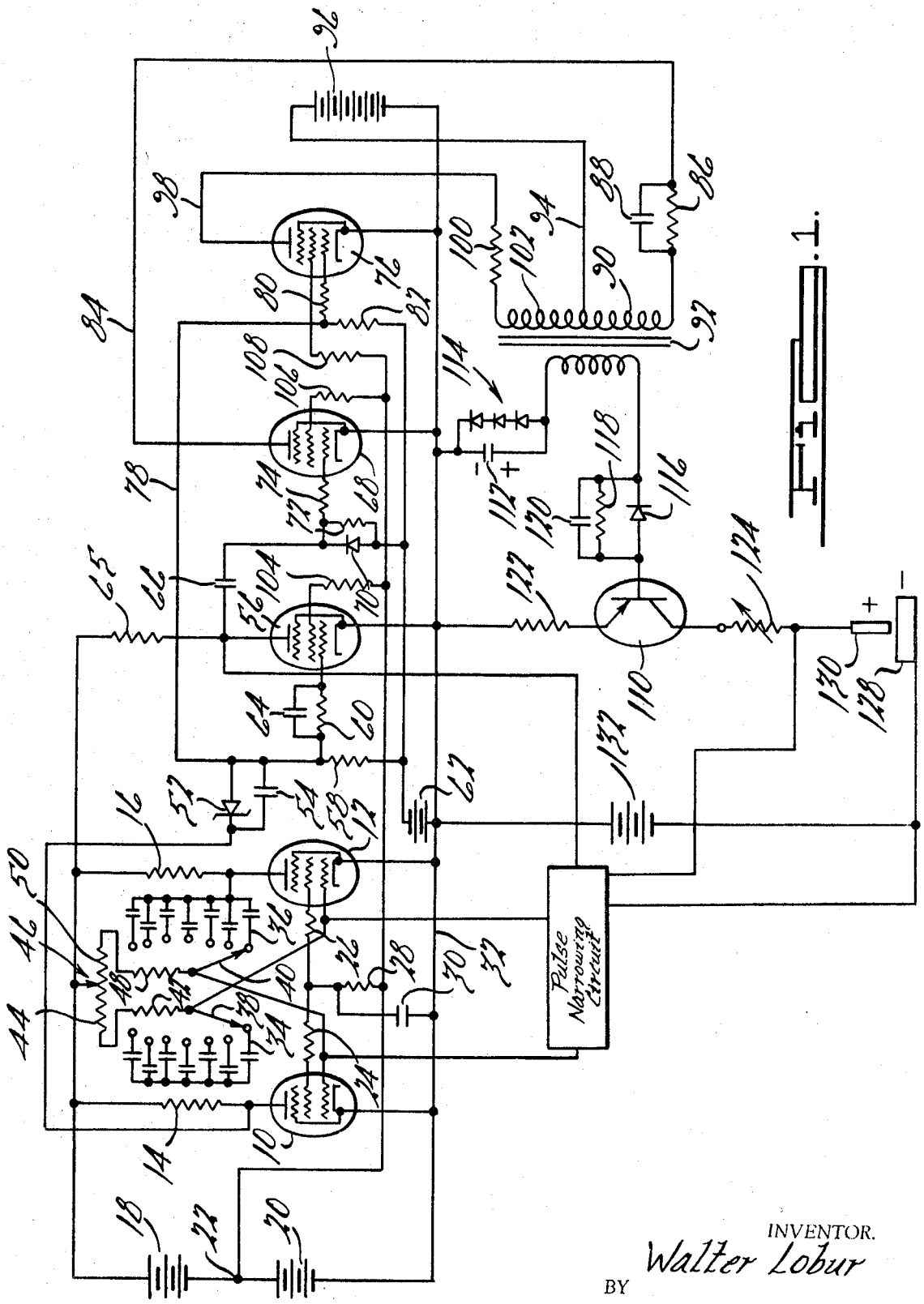
INVENTOR.
Walter Lobur
BY
Harry R Dumont
ATTORNEY

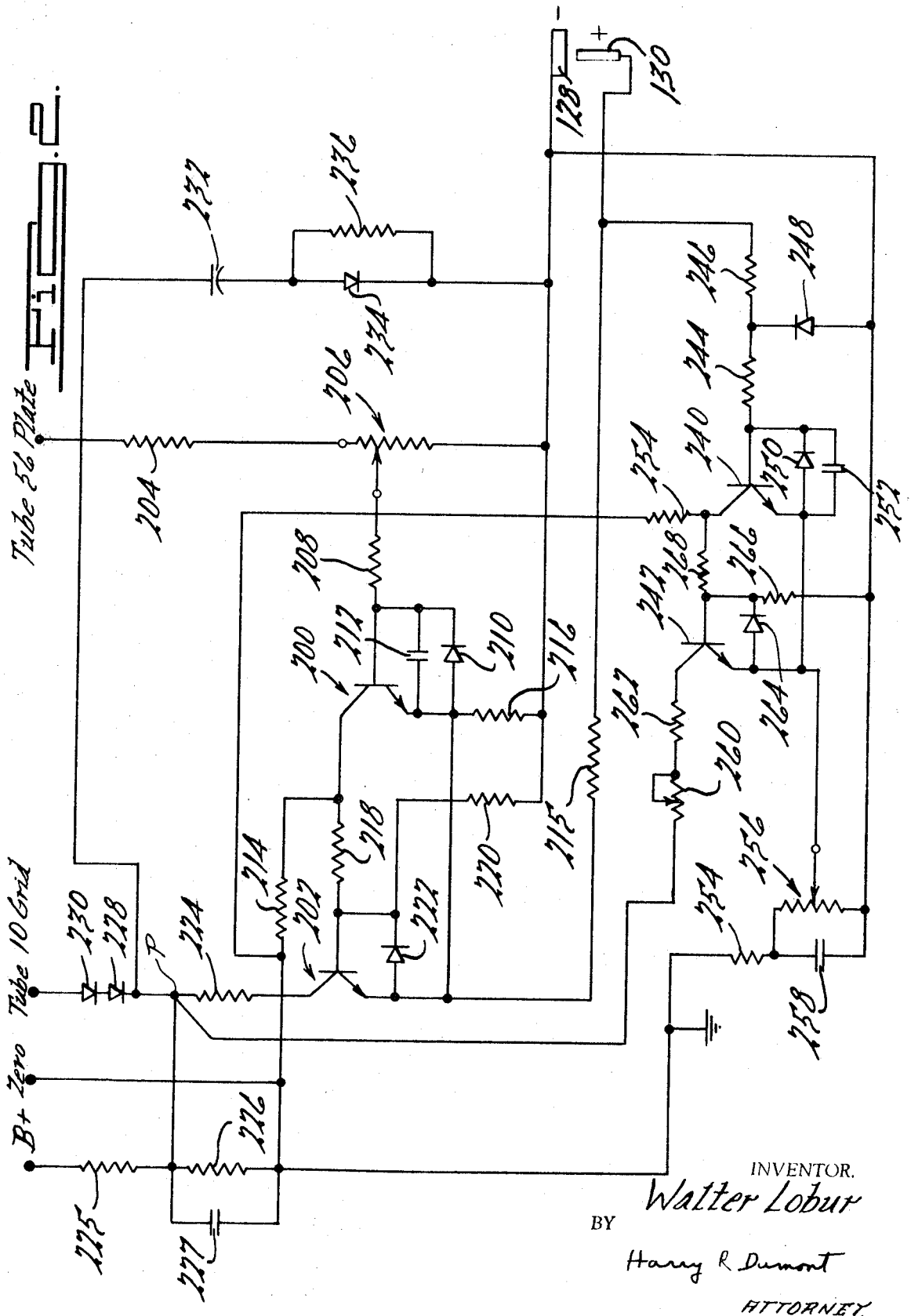

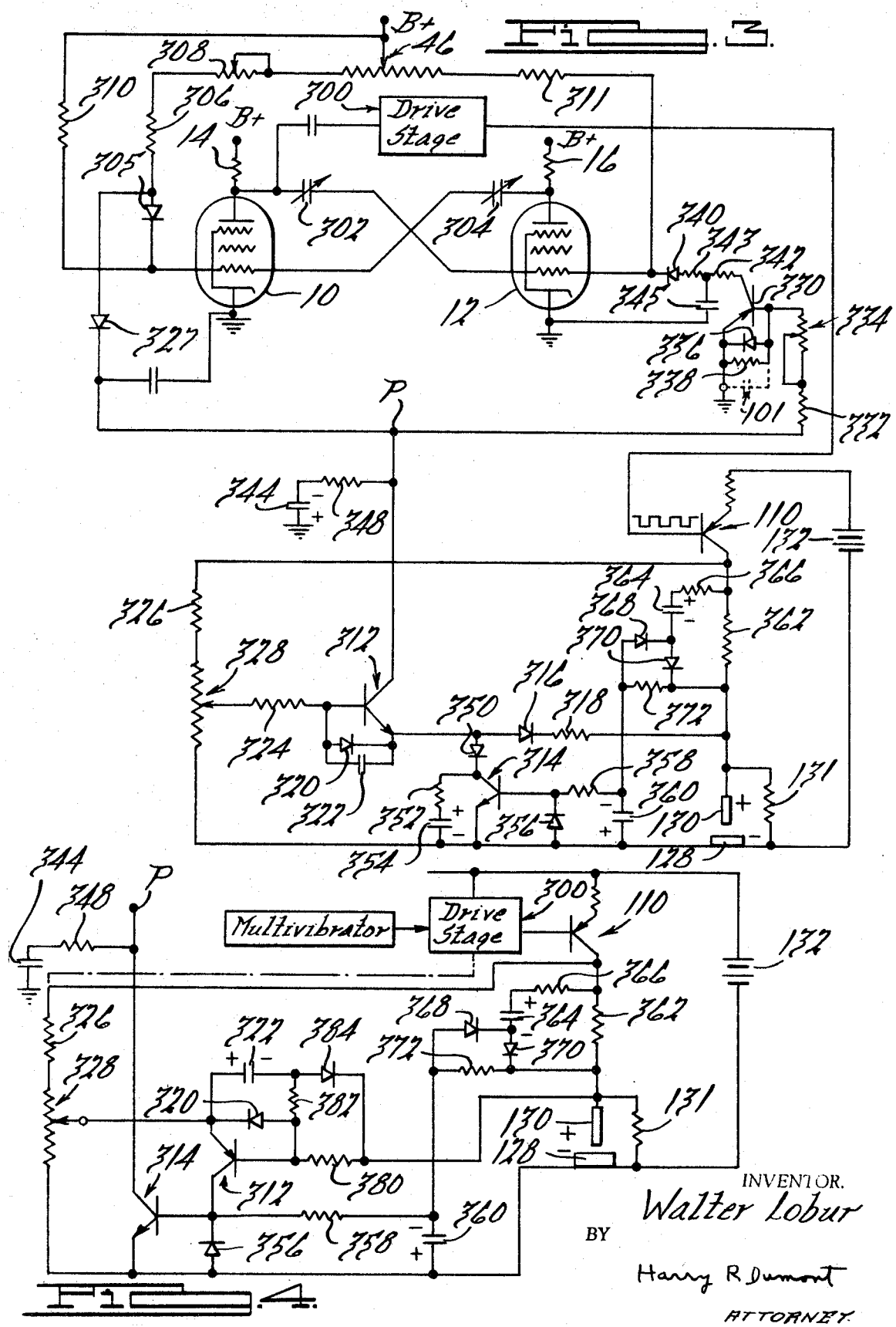

United States Patent Office 3,515,838
Patented June 2, 1970

3,515,838
ELECTRICAL DISCHARGE MACHINING PULSE DURATION CONTROL APPARATUS AND METHOD
Walter Lobur, Clawson, Mich., assignor, by mesne assignments, to Elox Inc., Troy, Mich., a corporation of Michigan
Continuation-in-part of application Ser. No. 565,510, July 15, 1966. This application Feb. 21, 1967, Ser. No. 617,700
Int. Cl. B23p 1/08
U.S. Cl. 219—69
16 Claims

ABSTRACT OF THE DISCLOSURE

A circuit for providing machining power pulse on-off time control responsive to gap short circuit condition and responsive to gap open circuit condition. On gap open circuit such as occurs on initial down-feed, pulses are narrowed to reduce power to the gap until normal cutting and gap discharges occur. On gap short circuit condition, pulses are continued across the gap but are narrowed until that condition is terminated.

CROSS-REFERENCE TO RELATED APPLICATION

This application is a continuation-in-part of my U.S. application Ser. No. 565,510, filed July 15, 1966, entitled "Electrical Discharge Machining Apparatus for Multiple Electrodes."

BACKGROUND OF THE INVENTION

The field to which my invention relates is that known as electrical discharge machining in which material is removed from an electrically conductive workpiece by the action of electrical gap discharges between a tool electrode and the workpiece. An electrode servo feed system is employed to maintain an optimum gap spacing between electrode and workpiece. A dielectric coolant is circulated through the gap during operation. For best results, a power supply of the independent pulse generator type is utilized to provide machining pulses of precisely controllable frequency and current magnitude.

During the machining operation, the gap may become bridged by workpiece particles to cause a condition known as gap short circuit. This condition is accompanied by excessive localized heat which tends to damage both electrode and workpiece unless corrective action is promptly taken. Such corrective action may include servo feed withdrawal or complete interruption to the gap. Reliance on either of these methods may substantially reduce the rate of machining. An additional problem arises at the beginning of any machining operation on initial approach of electrode to workpiece. If the coolant flow is insufficient or the current is excessive for the opposed electrode-workpiece areas, gap short circuit may immediately result with damage to electrode, workpiece or both. If electrode particles break off and bridge the gap, these may be porous and offer high electrical resistance simulating a gap voltage level approximating that of normal or open circuit voltage. The localized heating that results similarly to a short circuit condition may cause cracking of the electrode on its machining face or may cause a local melt area damage to the workpiece.

SUMMARY OF THE INVENTION

My invention provides a circuit for pulse narrowing which, when properly initiated and controlled, serves to increase temporarily electrode wear and machine away local trouble spots until normal cutting is restored. The gist of my invention is the provision of selective machining pulse on-off time control responsive to gap open circuit or gap short condition to eliminate the problems above referred to. Gradual resumption of pulse duty factor to the normal level is further provided after removal of the aforesaid conditions.

BRIEF DESCRIPTION OF THE DRAWINGS

FIG. 1 is a schematic of an electrical discharge machining power supply of the transistor type;

FIG. 2 is a schematic showing one form of my invention to be employed in conjunction with the power supply of FIG. 1;

FIG. 3 is a combined schematic and diagrammatic showing of an alternate form of my invention; and FIG. 4 is a combined schematic and diagrammatic showing of a still further and preferred embodiment of my invention.

DESCRIPTION

Referring now to the drawing of FIG. 1, a pulsating drive signal is generated by an astable multivibrator including a pair of electron tubes 10, 12, biased and coupled for alternate operation. Tubes 10 and 12 are connected respectively through plate load resistors 14 and 16 to the positive terminal of plate supply 18. The negative terminal of D.C. supply 18 is in turn connected to the positive terminal of supply 20. Power supplies 18 and 20, together comprise the plate power supply for the multivibrator and first stage of amplification. A tap 22 connects between supplies 18 and 20 to provide screen voltage for the various stages of pentode amplification. The screen grid of tube 10 is connected through a resistor 24 to the common screen tap of the multivibrator circuit. The screen grid of tube 12 is connected through a resistor 26 to the common tap which is in turn connected through a resistor 28 to screen tap 22 of the main supply. A by-pass capacitor 30 connects the common junction of resistors 24, 26 and 28 to the common ground of the system which is represented by lead 32.

Cross-coupling capacitors 34 and 36 are selected by frequency selector switches 38 and 40 and cross-couple the plates of tubes 10 and 12 to the opposing tube grid. The control grid of tube 12 is returned to the positive terminal of the anode power supply through a limiting resistor 42 and a portion 44 of rheostat 46. The control grid of tube 10 is similarly returned through a limiting resistor 48 and portion 50 of rheostat 46 to complete the connection of the multivibrator circuit itself.

The signal output of multivibrator tube 10 generated across resistor 14 is coupled through a reference diode 52 and shunt capacitor 54 to the control grid circuit of a pentode amplifier 56. The negative terminal of reference diode 52 and capacitor 54 is connected to the junction between resistors 58 and 60 as shown. Resistor 58 returns the grid of tube 56 to negative bias 62 and during periods of off-time for tube 56 maintains this tube nonconductive. Resistor 60 limits grid current during periods of on-time thus decoupling the control grid of the tube 56 from the multivibrator circuit. A small magnitude capacitor 64 is connected across resistor 60 to provide sharp leading edge drive to tube 56 to insure sharp switching characteristics of this tube. The output of tube 56 is developed across a plate load resistor 65 which returns the anode of tube 56 to the anode power supply 18. A coupling capacitor 66 couples the signal output of tube 56 to the grid of drive tube 68. The grid of tube 68 is clamped to bias 62 source through a diode 70. A resistor 72 is connected in parallel with diode 70 to provide off bias for tube 68 during periods of its nonconduction. A resistor 74 limits the grid current to tube 68 in a manner similar to resistor 60 of tube 56. Grid resistors 60 and 74 are used for decoupling to prevent parasitic or other self-oscillation.

The control grid of a tube 76 is returned by a lead 78 to the negative terminal of reference diode 52. A resistor 80 limits grid current from tube 76 and a resistor 82 provides a localized bias return for this tube. Amplifier tubes 68 and 76 are generally comprised of a bank of several tubes for providing sufficient drive power to successive stages. The plate of tube 68 is connected through a lead 84 to a network comprising resistor 86 and shunt connected capacitor 88. The opposite side of this network is connected to one side of a primary 90 of drive coupling transformer 92. A lead 94 provides a center tap connection for the transformer primary and connects the plate circuit of tube 68 to the positive terminal of a drive power supply 96. Tube 76 is connected through a lead 98 to a resistor 100 which returns the plate of a tube 76 through a portion 102 of the primary of transformer 92. Thus tubes 68 and 76 obtain plate power from D.C. supply 96 through common lead 94. The screen grid of tube 56 is returned through a limiting resistor 104 to screen tap 22. Similarly, the screen of tube 68 is returned through a resistor 106 and the screen of tube 76 is returned through a resistor 108 to the screen tap 22 on the negative terminal of the multivibrator plate power supply 18.

The secondary of transformer 92 is connected to drive a transistor bank 110 alternately conductive and nonconductive to provide machining pulses across the gap. While the electronic switches employed in the embodiment of this invention are transistors, the invention is not so limited but, with proper redesign of the circuit by one skilled in the art, any electronic switch may be substituted. One side of the secondary of transformer 92 is connected to the positive terminal of a network comprising capacitor 112 and shunt connected diodes 114. The negative terminal of this network is connected to reference ground 32. The opposite side of the secondary of transformer 92 is connected through a diode 116 to the base of PNP transistor 110. Connected in parallel with diode 116 is a resistor 118 and a capacitor 120.

Diodes 114 are silicon or germanium devices and have a minimum conduction voltage of approximately 0.6 to 0.8 volt each. The cathode of this diode string is connected to the negative terminal of capacitor 112 and the number of series connected diodes in the string is chosen to determine the minimum desired bias voltage across capacitor 112.

The emitter of transistor 110 is connected through a balancing resistor 122 to reference lead 32. The collector of transistor 110 is connected through a variable power resistor bank 124. The opposite end of this network is connected to the electrode 130 in this example. Electrode 130 is maintained in spaced relationship to the workpiece by a suitable servo feed system as is known is the electrical discharge machining art. The workpiece 128 is connected to the negative terminal of a machining power supply 132. The positive terminal of machining power supply 132 is connected to reference ground 32 thereby completing the discharge loop.

Operation of this circuit is controlled by multivibrator tubes 10 and 12 in the manner previously described. The grid return of this multivibrator is important in a modern electrical discharge machining power circuit because of the wide range of on-off ratio or duty factor required at a particular frequency to control metal removal rate. This is achieved by returning the adjustable tap on rheostat 46 to the fixed D.C. voltage which, in this instance, is the positive terminal of anode supply 18. As the adjustable tap is moved from side to side, a decrease in resistance 44, for example, produces a corresponding increase in resistance 50, thereby maintaining constant total grid resistance even though each grid circuit varies widely. Therefore, a constant frequency is maintained regardless of the position of the adjustable tap on rheostat 46, to provide a wide range in on-off ratio at a fixed frequency.

To select a different operating frequency, switches 38 and 40 which are normally ganged together as a frequency control, select different capacitors in the respective grid circuits. In this example, six frequency taps are shown. The output of multivibrator tube 10 is produced across plate load resistor 14 and is a substantially rectangular signal having a frequency determined by the composite grid circuit resistance in conjunction with capacitors 34 and 36 and a duty factor determined by the setting of the adjustable tap on rheostat 46.

Multivibrator tube 10 and power transistor bank 110 are "on," or conductive, in phase with a discharge across the gap between electrode 130 and workpiece 128. For extremely low duty factor, insufficient power is transferred through a coupling capacitor for proper drive of successive stages of amplification and therefore a circuit is required to properly couple the output of the multivibrator to amplifier tube 56. The proper coupling circuit is achieved through use of reference diode 52 and shunt capacitor 54 for referencing a rectangular or pulse output developed across signal resistor 14 downward as is required for proper control of the grid of amplifier tube 56. Bias return resistor 58 maintains tube 56 nonconductive during periods of nonconduction of tube 56. This is achieved as multivibrator tube 10 becomes conductive, thereby generating a voltage drop across resistor 14. A typical value for plate supply voltages 18 and 20 is approximately 250 volts total. The drop across multivibrator tube 10 during conduction is approximately 100 volts, therefore generating a signal of approximately 150 volts across resistor 14.

As long as the regulated voltage of reference diode 52 is larger than the drop across tube 10, the control grid of tube 56 will at this time be negative. In the example given, reference diode 52 would have a magnitude of regulation of approximately 200 volts and the control grid of tube 56 would therefore be biased to approximately minus 100 volts. Reference diode 52 and capacitor 54 form a network for producing a floating D.C. voltage having almost no capacitive losses during switching such as would be encountered if a D.C. supply of normal characteristics produced from a transformer winding and rectifiers were employed at this point. The smaller shunt or leakage capacity resulting from this network which is floating on the plate of tube 10 to lead 32 or other circuit components, results in far less shunt losses than would occur with a conventional D.C. supply connected at this point.

As multivibrator tube 10 becomes nonconductive, the voltage signal across resistor 14 disappears, thereby carrying the reference diode circuit positive. In this example, with a 250 volt plate supply and a 200 volt reference diode, approximately 50 volts is developed across resistor 60 connected to the control grid of tube 56 since the control grid clips the signal at approximately the same voltage as the cathode of tube 56. An extremely small lead capacitor 64 is connected across resistor 60 for improving the sharp rise and fall characteristics of this signal, thereby causing amplifier 56 to both amplify and resquare the signal as well as decouple the multivibrator from successive stages of amplification.

Rectangular pulsating signal of amplified power is therefore generated across load resistor 65 connected in the plate circuit of tube 56 and is coupled through capacitor 66 to the control grid circuit of tube 68. Diode 70 clamps this pulsating signal to bias 62 and resistor 74 and limits grid current during periods of conduction of tube 68 since the signal developed across resistor 72 is in excess of the bias voltage 62. Power is transferred through coupling capacitor 66 to drive the control grid to tube 68 and a normal coupling circuit may be employed in the control grid circuit of tube 68.

The control grid circuit of tube 76 is driven by the same source of signal as tube 56 and is therefore connected to the reference diode network 52, 54 by lead 78. The drive characteristics of this tube are quite similar to that of tube 56 except that a number of tubes may be employed in parallel in place of tube 76.

Electron flow during drive of transistor 110 bank is from lead 32 through tube 68 to plate lead 84. During the instant of turn On, electron flow passes through capacitor 88 since there is zero voltage across capacitor 88 at the instant of turn On. Primary 90 of transformer 92 completes the circuit to the positive terminal of drive power supply 96.

Electron flow in the primary 90 of transformer 92 produces a corresponding electron flow in its secondary causing drive current to transistor 110 to flow through diode 116, the base-emitter of transistor 110, balancing resistor 122, bias capacitor 112 to the positive terminal of the secondary winding. During this condition of forward drive to transistor 110, excess voltage across capacitor 112 is limited by the shunt diode network as described above to approximately 2 volts in this example.

Drive current causes transistor 110 to become conductive. If the gap between workpiece 128 and electrode 130 is sufficiently small to permit a gap discharge, electron flow occurs from the negative terminal of discharge power supply 132, workpiece 128, electrode 130, resistor 124, collector-emitter of transistor 110, balancing resistor 122, to the positive terminal of supply 132.

After a period of conduction of transistor 110, the transistor bank is driven off under power by conduction of tube bank 76. Turn Off electron flow occurs in the primary circuit of transformer 92 from lead 32, tube 76, lead 98, limiting resistor 100, primary 102, lead 94 to the positive terminal of drive power supply 96. Conduction of electron flow in this winding is of opposite phasing and causes a reverse current flow in the secondary of transformer 92. During the period of turn Off, electron flow occurs from the secondary of transformer 92 through capacitor 112, balancing resistor 122, emitter-base of transistor 110, capacitor 120, to the opposite side of the secondary of transformer 92. After transistor 110 becomes nonconductive, the emitter-base junction blocks in this polarity and retards further current flow. If this transistor is an alloy junction device or other type having a high reverse voltage rating between emitter and base, electron flow does not continue except for the minute amounts resulting from reverse leakage of the junction. Typical transistors employed in this bank, however, are the diffused junction type and are of such construction that a relatively low voltage in reverse across the base-emitter junction causes reverse conduction. The magnitude of such reverse conduction is limited by resistor 118 since electron flow is blocked by diode 116 and is limited to a value that is safe to transistor 110 and nonsaturating to transformer 92.

Regardless of transistor type, this drive circuit, particularly drive transformer 92 and the current limiting networks, is subject to particular consideration. As mentioned above, the duty factor at a particular frequency can vary widely and in a typical advance machining circuit will vary from a minimum of approximately 1 percent duty factor at a particular frequency to a maximum of approximately 80 or 90 percent duty factor or conduction period of the machining cycle. A transformer, on the other hand, is an A.C. device in which the positive voltage area of either secondary or primary must exactly equal the negative voltage area. It is therefore virtually impossible and certainly impractical to operate transformer 92 in push-pull without saturating its iron core during periods of narrow on-time regardless of the type of transistor utilized. Proper circuit design is required to prevent saturation during periods of wide on-time when the transformer is used to drive a diffused junction transistor having extremely low emitter-base reverse voltage limit.

The pulse narrowing circuit which is the subject of the present invention is indicated in FIG. 1 in block diagrammatic form. The operation of the pulse narrowing circuit is to provide a control voltage or control voltage output to the power supply multivibrator to selectively vary its pulse on-time and off-time and hence the machining current responsive to gap open circuit or to gap short circuit.

FIG. 2 shows the detail of the pulse narrowing circuit. The upper portion of the circuit provides gap open circuit pulse control. The lower portion of the circuit provides gap short circuit pulse control. Both portions are connected by twisted lead pairs to the machining gap comprising electrode 130 and workpiece 128. Gap polarity is of the reverse polarity with electrode positive and workpiece negative.

The open circuit control portion includes transistors 200 and 202. Transistor 200 and its associated circuitry have the basic function of comparing the voltage across the machining gap with the voltage driving the output transistor bank 110. When an actual gap discharge does not occur, the voltages are so unbalanced that there occurs no output pulse from transistor 200. Transistor 200 has its base connected to a keyed reference source including the plate of tube 56, fixed resistor 204, potentiometer 206 and resistor 208. A network comprising clamping diode 210 and storage capacitor 212 is connected across the base emitter of transistor 200. The collector of transistor 200 is coupled to a B+ bias through resistor 214 while its emitter is connected to the negative gap terminal through the voltage divider comprising resistors 215 and 216. When an actual gap discharge occurs, transistor 200 is biased on and a pulse output occurs. Otherwise stated, transistor 200 develops a pulse output for each time the gap fires, but provides no pulse output for "missed" pulses.

Transistor 202 is an inverter-amplification stage with its base connected to the collector of transistor 200 through resistor 218. The collector of transistor 202 is connected to point P through resistor 224 and to a B+ bias source through resistor 225. A parallel RC network comprising resistor 226 and capacitor 227 is connected as shown. Transistor 202 provides a pulse of the opposite going polarity from the pulse output of transistor 200. Transistor 202 has its emitter connected to the emitter of transistor 200 while its base returns consist of the signal path from transistor 200 through resistor 218 forming a "bias divider" with resistor 220 which returns to the negative gap terminal. Clamping diode 222 is connected across the base emitter of transistor 202 as shown. The biasing of transistor 202 is such that with each pulse output from transistor 200, its collector approaches a high positive voltage level. This voltage appears across resistors 224 and 226. When transistor 200 is held off, the current flow is through resistors 214, 218 to the base of transistor 202 to turn it on. The collector voltage of transistor 202 and the voltage at point P drop to a negative level. This negative voltage provided through diodes 228, 230 to the grid of multivibrator tube 10 provides the required pulse narrowing. When firing of the gap is properly occurring, transistor 202 is held off, the voltage at point P is at a positive level and no pulse narrowing results.

Capacitor 232 is connected from point P to the minus gap terminal to integrate the output pulses of transistor 202. The network including diode 234 and resistor 236 is connected to control the time constant of capacitor 232. It is the function of capacitor 232 to provide for gradual restoration of the machining pulse on-time to its normal length as normal machining operation is restored.

The lower portion of the circuit of FIG. 2 shows transistors 240 and 242 which, with their associated circuitry, provide pulse narrowing in response to gap short circuit. Transistor 240 has its base connected to the gap through a voltage divider and diode network comprising resistors 244, 246 and diode 248. Transistor 240 further has its base emitter paralleled by a diode-capacitor network including diode 250 and storage capacitor 252. Collector bias is provided through resistor 254. The emitter of transistor 240 is referenced to a fixed voltage level through the network comprising resistor 254 and potentiometer 256. The variable resistor of potentiometer is shunted by capacitor 258.

Transistor 242 provides an inverter-amplification stage. The collector of transistor 242 is connected to point P through potentiometer 260 and resistor 262. Clamping diode 264 is connected across the base emitter of transistor 242 with resistor 266 connected to the positive gap terminal. Signal resistor 268 is connected between the collector of transistor 240 and the base of transistor 242. Transistor 240 is normally biased in its conductive state. Whenever gap voltage drops to a level indicating machining gap short circuit, the base of transistor 240 becomes less positive than its emitter. This turns off transistor 240. Current flow is then through resistors 254 and 268 to provide a turn-on signal to the base of transistor 242. When a turn-on signal is received, the collector of transistor 242 goes to ground or negative to provide a negative going signal to point P and to the grid of multivibrator tube 10. This provides pulse narrowing of its multivibrator whenever the gap voltage drops below the reference level preset by potentiometer 256 to indicate gap short circuit. Capacitor 232 again is effective to integrate this narrowing signal and to provide gradual pulse widening after the gap short circuit condition has been removed.

FIG. 3 is a combined block diagrammatic and schematic showing of an alternate embodiment of my invention. The electrical discharge machining power supply is similar to that of FIG. 1 with electrical machining pulses provided across the gap by a multivibrator pulse output being provided to a bank of switching transistors 110. In the FIG. 3 circuit, the multivibrator pulse output is taken from the plate of tube 10 and passed through one or more intermediate drive stages 300 similar to those shown in detail in FIG. 1 and to transistor 110 for alternately triggering it on and off. A keyed cut-off reference is connected between the pulse narrowing circuit shown in the bottom of the drawing and the output of transistor 110 for a purpose which will be explained hereinafter. The multivibrator is shown in somewhat simplified form with ganged capacitor tap switches 38 and 40 of FIG. 1 replaced with variable capacitors 302 and 304 for varying the pulse output frequency. The control grid of tube 10 is returned to B+ through diode 305, resistor 306, potentiometer 308 and a preselected portion of the variable resistor of potentiometer 46. A large magnitude resistor 310 is shunted between the movable contact of potentiometer 46 and the control grid of tube 10. The control grid of tube 12 is returned to B+ through resistor 311 and the preselected portion of the variable resistor of potentiometer 46. It will be seen that as the movable contact of potentiometer 46 is moved leftwardly, the pulse output on-time and the machining current will be increased toward its maximum limit. Correspondingly, the off-time will be diminished. The pulse narrowing portion of the circuit has a mode of operation similar to that of the FIG. 2 circuit. Transistor 312 provides pulse narrowing responsive to gap short circuit while transistor 314 provides pulse narrowing responsive to gap open circuit. Transistor 312 has its emitter connected to electrode 130 through the series branch including diode 316 and resistor 318. The emitter base of transistor 312 is shunted by a network including diode 320 and capacitor 322. Transistor 312 further has its base connected through resistor 324 to a keyed voltage reference comprising fixed resistor 326 and potentiometer. 328. When the gap voltage sensed drops to a level indicating gap short circuit, transistor 312 will be turned on. This causes the voltage at point P to go negative to control multivibrator on-off time. Off time will be increased by shunting flow of current from the multivibrator B+ source through diode 327. At the same time, pulse on-time will be decreased by the negative voltage appearing at point P. The decrease of pulse on-time is provided through the operation of transistor 330 which has its base connected to point P through resistor 332 and potentiometer 334. A diode 336 and resistor 338 are connected across the base emitter of transistor 330 as shown. The collector of transistor 330 is connected to the control grid of multivibrator tube 12 through diode 340. Resistors 342 and 343 are connected to a common terminal of local by-pass capacitor 345, When the voltage at point P goes to a negative level, indicating a short circuit condition, transistor 330 turns on. The voltage on the grid of tube 12 goes positive to decrease pulse on-time. A storage capacitor 344 is connected through resistor 348 to delay the return of the multivibrator to its normal on-off time ratio subsequent to removal of gap short circuit or open arc condition.

The open circuit condition pulse narrowing is controlled by transistor 314 which has its collector connected to the emitter of transistor 312 through diode 350 as shown. A series RC network including resistor 352 and capacitor 354 is connected across the collector emitter of transistor 314. A clamping diode 356 is connected across the emitter base of transistor 314 which diode is shunted by resistor 358 and storage capacitor 360. A network is connected to sense the occurrence of actual gap discharges occurring between electrode 130 and workpiece 128. This network includes a resistor 362 corresponding to resistor 124 of FIG. 1 which resistor is connected in series between the output of transistor bank 110 and the machining gap. Each time a gap discharge breakdown occurs, a voltage is developed across resistor 362 which charges capacitor 364 through resistor 366 and diode 370 with a voltage of a polarity as shown. Diodes 368 and 370 are connected to the lower terminal of capacitor 364 with a phasing as indicated. Resistor 372 further is connected as shown. So long as gap discharges are occurring, transistor 314 will be maintained in a nonconductive condition through the voltage stored on capacitor 360. When gap discharges cease to occur on gap open circuit, transistor 314 will be turned on and current flow will occur through diode 350 to lower the emitter voltage of transistor 312 to turn it on. This again will lower the voltage at point P to provide multivibrator off-time increase and on-time decrease in the manner previously described in connection with gap short circuit condition.

The circuit of FIG. 4 shows a preferred embodiment of my invention. The power supply circuit including multivibrator, drive stages 300, transistor bank 110 and the gap discharge circuit are the same as illustrated in FIG. 3. The machining gap is paralleled by bleeder resistor 131. Transistor 314 controls pulse narrowing responsive to gap open circuit condition. Transistor 312 controls pulse narrowing responsive to gap short circuit condition. The control circuit for transistor 312 differs from that employed in the FIG. 3 circuit. Additionally, the method whereby transistor 312 drives transistor 314 greatly amplifies short circuit cut-off sensitivity and provides a well defined error cross over.

Transistor 314 has its collector connected to point P, the voltage of which point is effective to control multivibrator on-off time as has been explained in connection with FIG. 3. Transistor 314 becomes conductive as the percentage of non-fired arcs increases. The network associated with resistor 362 is effective to provide a control voltage to the base of transistor 314. The network associated with transistor 312 includes the series network of diode 384 and capacitor 322. Signal resistor 380 is connected between the base of transistor 312 and electrode 130. Resistor 382 and diode 384 are connected as shown. Diode 384 stores error voltage on capacitor 322 with a polarity as shown. Capacitor 322 discharges through resistor 382 into the base of transistor 312 to prolong its conduction time. A keyed reference is provided to transistor 312 from drive stage 300 through potentiometer 328. A delay capacitor 101 is indicated in phantom across resistor 100 for a purpose and function that will be explained in the description of operation hereinafter. In the interest of brevity, those additional circuit elements common to the circuits of FIGS. 3 and 4 will not now be repeated.

DESCRIPTION OF OPERATION

The pulse narrowing circuits shown and described are of particular importance for certain electrode materials such as graphite which are capable of very low electrode wear during machining. The gap open circuit narrowing control is of importance on initial downfeed when machining at an excessively high current level at initial small contact area can cause damage. Pulse narrowing at this time serves to prevent automatically the passage of full machining current until a seating occurs, work-electrode gap area increases and a stable cutting condition is attained. This feature is of greatest advantage when the electrode has projecting surface points or narrow ribs on its machining face so that current density is great at small areas as the cutting begins.

The circuit of FIG. 2 provides keyed operation of the open circuit sensing transistor 200 each time a pulse occurs in an intermediate drive stage such as tube 56. Transistor 200 is keyed on for each pulse provided by the power supply multivibrator. When an actual gap discharge occurs during the normal pulse duration, transistor 200 is operated. Current flow is provided from the B+ source through resistor 214 and the collector emitter of transistor 200. When a pulse fails to initiate actual gap discharge, transistor 200 remains open. Current flow is then from the B+ source through resistors 214 and 218 to the base of transistor 202. Transistor 202 then turns on and its collector voltage at point P goes negative. This negative voltage on the grid of multivibrator tube 10 narrows the pulse on-time and therefore reduces the power furnished to the machining gap. I have found it highly advantageous to provide for gradual rather than abrupt restoration of machining circuit to its full value after the open circuit condition has terminated. This gradual restoration is provided by the action of capacitor 232 and its associated time delay network.

To provide for the condition of gap short circuit, I have employed the network including transistors 240 and 242. Gap voltage is sensed through the network including diode 248 and resistors 244, 246. When the gap voltage drops below a level preset by potentiometer 256, transistor 240 is turned off to provide a signal pulse to the base of transistor 242. This causes turn-on of transistor 242 and a voltage drop at point P. This voltage drop is communicated to the grid of tube 10 of the multivibrator to narrow machining pulse on-time and reduce the power content of the pulses being furnished to the machining gap until the short circuit condition has been removed. It will be appreciated that servo feed operation will normally be operating at all times to maintain proper gap spacing. The relative advance and withdrawal of electrode and workpiece is accompanied by sufficient time delay that current control such as by my pulse narrowing circuit must be also provided to insure against damage to electrode and workpiece.

The pulse narrowing circuits of FIG. 3 are effective not only to narrow the pulse on-time, but to increase the pulse off-time responsive to gap short circuit or gap open circuit. This insures positive machining current control over the widest possible frequency ranges without altering the normal frequency of operation of the multivibrator. The short circuit pulse narrowing is provided by the operation of transistor 312 which is keyed toward operation each time a machining pulse output is provided from the power supply. Transistor 312 is held off so long as gap voltage sensed remains above the reference level preset by potentiometer 328. When gap voltage sensed falls below that level, transistor 312 is turned on. The collector voltage of transistor 312 drops and pulls down the voltage at point P. When a negative voltage occurs at point P, current flow occurs through diode 327 and is hence shunted from the grid of multivibrator tube 10. The grid is driven in a negative direction to increase the off-time of the pulse being furnished to the machining gap. Current flow is provided through resistor 310 to prevent total turn-off of the multivibrator. At the same time, when point P goes negative, transistor 330 is turned on to bias the grid of tube 12 positively to decrease the on-time of the pulse being provided by the multivibrator to the machining gap. Open arc pulse narrowing is provided by transistor 314. A hold off bias is developed across resistor 362 which is responsive to passage of current to the gap each time an actual gap discharge occurs. When one or more pulses have been generated by the power supply without an accompanying gap discharge, transistor 314 is triggered on. This lowers the emitter voltage of transistor 312 to turn it on. The drop in collector voltage of transistor 312 lowers the voltage at point P to again initiate conjoint decrease of pulse on-time and increase of pulse off-time. In this way, pulse narrowing is possible without altering the preset frequency of operation of the multivibrator. Upon removal of the short circuit or open circuit conditions, capacitor 344 is discharged to provide gradual restoration of pulse on-time to that period preset by multivibrator potentiometer 46.

The circuit of FIG. 4 includes transistors 312 and 314 which are connected with a different phasing from that of FIG. 3 to control the short circuit narrowing and open circuit narrowing, respectively. Transistor 314 is embodied as an NPN transistor while transistor 312 is embodied as a PNP transistor. The manner in which transistor 312 drives transistor 314 greatly amplifies the short circuit cut-off sensitivity and gives a well defined circuit crossover.

The open arc operation is controlled by transistor 314. During normal cutting, the arc current will cause a pulsed voltage voltage to occur across resistor 362 with a polarity as shown. This voltage is stored on capacitor 364 through diode 370 and surge resistor 366. During signal off time when the voltage across resistor 362 drops to zero, the charge on capacitor 364 is transferred through diode 368 to capacitor 360 through resistors 366, 362 and 131 which complete the circuit to capacitor 360. This voltage is applied between the base and emitter of transistor 314 through a time constant and decoupling resistor 358 so as to keep transistor 314 turned off and permit normal multivibrator and drive signals. When the percentage of no-fired arcs increases, resistor 372 will gradually cause the voltage across capacitor 360 to reverse polarity from that shown and cause transistor 314 to conduct. This causes a voltage drop at point P which controls through multivibrator an increase in off time and corresponding decrease in on time of the machining pulses. When no actual discharges occur on gap open circuit, there will be no voltage drop across resistor 362 and no capacitor-diode voltages as above described can occur.

During gap short circuit, transistor 312 is operated to initiate its conduction and the turn on of transistor 314 to likewise decrease the voltage at point P. The emitter of transistor 312 is connected to the keyed reference while its base is connected to electrode 130 through resistor 380. It will be seen that resistor 326 and potentiometer 328 form a keyed voltage divider. The reference voltage appears in phase only during the machining pulse on time when switching transistor 110 is closed. The use of a keyed reference voltage reduces the possibility of stray signal triggering of cut-off during gap off time. Both reference and gap voltages are positive and appear simultaneously with transistor 312 responding to the difference between these voltages. Capacitor 322 and diode 384 are also connected between the two voltages. When the gap voltage is normal, the base of transistor 312 will be more positive than its emitter. Transistor 312 will thus remain in the open condition, so turn-on of transistor 314 will occur. Consequently, the voltage at point P will remain unchanged and normal operation of the multivibrator will be continued.

When the gap voltage drops to a value less positive than the reference voltage indicating gap short circuit condition, the base of transistor 312 will be rendered negative with respect to its emitter and transistor 312 will be turned on. Diode 384 stores error voltage on capacitor 322 with a polarity as shown. Capacitor 322 discharges through resistor 382 into the base of transistor 312 to prolong slightly its conduction time. This is desirable particularly when the machining power pulse on time or duty factor is small. When transistor 312 is conducting, it effectively ties the base of transistor 314 to the positive reference voltage. This causes transistor 314 to be rendered conductive and lower the voltage at point P to initiate pulse narrowing. Transistor 314 will conduct independently of the voltage stored on capacitor 360 because of the high decoupling resistance of resistor 358.

The operation of the circuits previously described is either to narrow pulse on time as in FIG. 2 or to vary selectively pulse on time and off time as in FIGS. 3 and 4. It is possible to further improve the operation of the circuit by providing a delay capacitor 101 as shown in phantom in the circuit associated with transistor 330. It is the function of transistor 330 to provide a control voltage to the grid of multivibrator tube 12 which voltage reduces the machining pulse on time responsive to a voltage drop at point P. Capacitor 101 is added to delay the reduction of pulse on time for an interval after increase in off time has been effected by voltage drop at point P as reflected to the grid of tube 10. I have found that during certain gap short circuit conditions, recovery of normal gap machining condition may be made by reduction of current through off time increase alone. It is desirable so far as possible to keep on-time constant to maintain overcut and wear conditions uniform. If recovery is not promptly made through increase of off time, for example when the short is caused by a minute projection or gap bridging from the electrode, then the operation of transistor 330 will be necessary to decrease the pulse on time, increase the wear ratio of electrode relative to workpiece and rapidly remove the projection to avert damage to the workpiece and restore normal machining operation. The operation of the circuit of FIG. 4 with delay capacitor 101 in the circuit is to provide pulse off time increase. Then, after a delay interval, pulse on time is decreased. After gap recovery is accomplished and the short condition of the gap is cleared, the multivibrator action is gradually returned to normal due to the operation of the delay network comprising capacitor 344 and resistor 348.

It will thus be seen that I have provided a new and improved apparatus and method of electrical discharge machining power pulse current control.

I claim:

1. In an apparatus for machining a conductive workpiece by passing electrical gap discharge pulses between a tool electrode and said workpiece across a dielectric coolant filled gap, a power supply, an electronic switch having a control electrode and a pair of principal electrodes, said principal electrodes operatively connected to said power supply and said gap for providing power pulses thereto, pulser means operatively connected to said control electrode of said switch for periodically operating it with a predetermined on-time, wherein the improvement comprises means operatively connected to said gap for sensing for the occurrence of gap discharge pulses, and means operatively connected between said last mentioned means and said pulser to narrow the on-time of said switch prior to occurrence of gap discharge pulses.

2. The combination as set forth in claim 1 wherein said means for sensing comprises a control electronic switch having a pair of principal electrodes and a control electrode, one of said principal electrodes and said control electrode connected between a reference voltage and said gap, the other of said principal electrodes operatively connected to provide a signal output to said pulser to control its on-time.

3. The combination as set forth in claim 2 wherein said pulser comprises an astable multivibrator including a pair of electronic switches having their respective principal and control electrodes biased and connected for alternate operation and wherein said control electronic switch has its output connected to the control electrode of one of said pair.

4. In an apparatus for machining a conductive workpiece by passing electrical machining pulses between a tool electrode and said workpiece across a dielectric coolant filled gap, a power supply, an electronic switch having a control electrode and a pair of principal electrodes, said principal electrodes operatively connected between said power supply and said gap for providing gap power pulses thereto, pulser means operatively connected to said control electrode of said switch for periodically operating it with a predetermined on-time, wherein the improvement comprises means operatively connected to one of said principal electrodes of said switch and to said gap for providing a signal output responsive to occurrence of a number of power pulses greater than the number of gap discharge pulses, and means operatively connected between said last-mentioned means and said switch for reducing the duration of said power pulses responsive to said signal.

5. In an apparatus for machining a conductive workpiece by passing gap discharge pulses between a tool electrode and said workpiece across a dielectric coolant filled gap, a power supply, an electronic switch having a control electrode and a pair of principal electrodes, said principal electrodes operatively connected between said power supply and said gap for providing power pulses thereto, pulser means operatively connected to said control electrode of said switch for periodically turning it on and off with a predetermined on-time, wherein the improvement comprises means operatively connected to one of said principal electrodes of said switch and to said gap for providing a signal output responsive to occurrence of a number of power pulses greater than the number of gap discharge pulses, and means operatively connected between said last-mentioned means and said pulser for reducing its on-time responsive to said signal.

6. In an apparatus for machining a conductive workpiece by passing electrical gap discharge machining pulses between a tool electrode and said workpiece across a dielectric coolant filled gap, a power supply, an electronic switch having a control electrode and a pair of principal electrodes, said principal electrodes operatively connected between said power supply and said gap for providing power pulses thereto, wherein the improvement comprises means operatively connected to one of said principal electrodes of said switch and to said gap for comparing the number of power pulses to the number of gap discharge pulses occurring, and means operatively connected between said last-mentioned means and the control electrode of said switch for reducing the duration of said power pulses responsive to a greater number of power pulses than gap discharge pulses.

7. The method of electrical discharge machining comprising the steps of periodically connecting a power supply to a machining gap to provide power pulses of predetermined duration thereto, wherein the improvement comprises sensing for the presence of actual gap breakdown discharges across the gap, and reducing the duration of said power pulses prior to occurrence of actual gap breakdown discharges across the gap.

8. The method of electrical discharge machining comprising the steps of periodically connecting a power supply to a machining gap to provide machining pulses of a predetermined time duration thereto, wherein the improvement comprises comparing the number of machining pulses provided to said gap to the number of actual gap discharges occurring, and reducing the time duration of said machining pulses responsive to occurrence of a number of machining pulses in excess of the number of actual gap discharges.

9. The method of electrical discharge machining comprising the steps of periodically connecting a power supply to a machining gap to provide machining pulses of a predetermined duration thereto, wherein the improvement comprises comparing the number of machining pulses provided to said gap to the number of actual gap discharges occurring, and reducing the on-time of said machining pulses responsive to a number of machining pulses in excess of the number of actual gap discharges occurring.

10. The method of electrical discharge machining comprising the steps of periodically connecting a power supply to a machining gap to provide machining pulses of a predetermined time duration thereto, wherein the improvement comprises comparing the number of machining pulses provided to said gap and the number of actual gap breakdown discharges occurring, and increasing and decreasing the time duration of said machining pulses by a factor which is a function of the ratio of the number of machining pulses to the number of actual gap breakdown discharges.

11. In an apparatus for matchining a conductive workpiece by passing electrical gap discharge pulses between a tool electrode and said workpiece across a dielectric coolant filled gap, a power supply, an electronic switch having a control electrode and a pair of principal electrodes, said principal electrodes operatively connected betwee said power supply and said gap for providing power pulses thereto, pulser means operatively connected to said control electrode of said switch for periodically operating it with a predetermined on-off time, means operatively connected to said gap for sensing the occurrence of gap discharge pulses, means operatively connected between said last mentioned means and said pulser for narrowing the on-time of said switch prior to occurrence of gap discharge pulses and means operatively connected between said last mentioned means and said pulser for increasing the off-time of said switch prior to occurrence of gap discharge pulses.

12. In an apparatus for machining a conductive workpiece by passing gap discharge pulses between a tool electrode and said workpiece across a dielectric coolant filled gap, a power supply, an electronic switch having a control electrode and a pair of principal electrodes, said principal electrodes operatively connected between said power supply and said gap for providing power pulses thereto, pulser means operatively connected to said control electrode of said switch for periodically turning it on and off with a predetermined on-off time, wherein the improvement comprises means operatively connected to one of said principal electrodes of said switch and to said gap for providing a signal output responsive to occurrence of a number of power pulses greater than the number of gap discharge pulses, means operatively connected between said last mentioned means and said pulser for reducing its on-time responsive to said signal and means operatively connected between said last mentioned means and said pulser for increasing its off-time responsive to said signal.

13. The method of electrical discharge machining comprising the steps of providing machining power pulses of a predetermined on-off time duration across a machining gap, wherein the improvement comprises sensing for short circuit condition of said gap; responsive to said condition, increasing the off-time of said pulses; after a delay interval, reducing the on-time of said pulses; and, subsequent to removal of said condition, gradually restoring the on and off time of said pulses to said predetermined time duration.

14. In an apparatus for machining a conductive workpiece by passing machining power pulses between a tool electrode and said workpiece across a dielectric coolant filled gap, a power supply, an electronic switch having a control electrode and a pair of principal electrodes, said principal electrodes operatively connected between said power supply and said gap for providing power pulses thereto, pulser means operatively connected to said control electrode of said switch for operating it with a predetermined on-off time ratio, wherein the improvement comprises means operatively connected to said gap for sensing gap short circuit condition, means operatively connected between said last mentioned means and said pulser for decreasing the on-time of said switch responsive to said condition and means operatively connected between said last mentioned means and said pulser for increasing the off time of said switch.

15. The combination as set forth in claim 14 wherein a delay network is operatively connected to said means for decreasing said on-time for inhibiting its operation a predetermined time after the operation of said means for increasing the off time of said switch.

16. The combination as set forth in claim 14 wherein a delay network is operatively connected to said last two mentioned means for providing gradual restoration of said switch on-off time to its predetermined ratio.

References Cited

UNITED STATES PATENTS

| | | | |
|---|---|---|---|
| 3,018,411 | 1/1962 | Webb | 219—69 X |
| 3,340,478 | 9/1967 | Poerschke | 219—69 X |

RALPH F. STAUBLY, Primary Examiner